United States Patent
Edge et al.

(10) Patent No.: US 10,834,696 B2
(45) Date of Patent: *Nov. 10, 2020

(54) METHOD AND APPARATUS FOR SUPPORTING POSITIONING FOR TERMINALS IN A WIRELESS NETWORK

(71) Applicant: QUALCOMM Incorporated, San Diego, CA (US)

(72) Inventors: Stephen W. Edge, Escondido, CA (US); Nathan E. Tenny, Poway, CA (US); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/175,751

(22) Filed: Oct. 30, 2018

(65) Prior Publication Data

US 2019/0069270 A1 Feb. 28, 2019

Related U.S. Application Data

(63) Continuation of application No. 15/411,244, filed on Jan. 20, 2017, now Pat. No. 10,149,275, which is a (Continued)

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0018* (2013.01); *G01S 5/0045* (2013.01);
(Continued)

(58) Field of Classification Search
CPC .... G01S 5/0018; G01S 5/0045; G01S 5/0054; G01S 5/0236; H04L 67/18; H04W 64/006
See application file for complete search history.

(56) References Cited

U.S. PATENT DOCUMENTS 6,021,433 A  2/2000  Payne et al.
6,603,976 B1  8/2003  Amirijoo et al.
(Continued)

FOREIGN PATENT DOCUMENTS

CN  1449209 A  10/2003
CN  1848845 A  10/2006
(Continued)

OTHER PUBLICATIONS

3GPP: "Overview of 3GPP Release 9 V0.0.5 (Apr. 2009)", pp. 1-174, Apr. 14, 2009.
(Continued)

*Primary Examiner* — Kashif Siddiqui

(57) ABSTRACT

Techniques for supporting positioning for a terminal (sometimes referred to herein as a target device) in a wireless network are described. In an aspect, positioning for a target device includes receiving a Request Location Information message that indicates at least one positioning method from a plurality of supported positioning methods. The Request Location Information message comprises common parameters that are applicable to all positioning methods indicated in the Request Location Information message. The common parameters comprise a quality-of-service (QoS), an indication of whether periodic location information is requested, an indication of whether triggered location information is requested, or any combination thereof. Positioning is performed in response to the Request Location Information message and can include determining a location estimate for a location of the target device.

19 Claims, 10 Drawing Sheets

Related U.S. Application Data continuation of application No. 15/227,766, filed on Aug. 3, 2016, now Pat. No. 9,867,161, which is a continuation of application No. 12/763,962, filed on Apr. 20, 2010, now Pat. No. 9,435,874.

(60) Provisional application No. 61/247,363, filed on Sep. 30, 2009, provisional application No. 61/234,282, filed on Aug. 15, 2009, provisional application No. 61/218,929, filed on Jun. 20, 2009, provisional application No. 61/172,719, filed on Apr. 25, 2009, provisional application No. 61/171,398, filed on Apr. 21, 2009.

(51) Int. Cl.
  *G01S 5/02* (2010.01)
  *H04L 29/08* (2006.01)

(52) U.S. Cl.
  CPC .......... *G01S 5/0054* (2013.01); *G01S 5/0236* (2013.01); *H04L 67/18* (2013.01)

(56) References Cited

U.S. PATENT DOCUMENTS

| | | | |
|---|---|---|---|
| 6,606,501 B1 | 8/2003 | Saha et al. | |
| 6,823,260 B1 | 11/2004 | Turcotte | |
| 6,999,762 B2 | 2/2006 | Uchida | |
| 7,370,118 B2 | 5/2008 | Tan et al. | |
| 7,376,430 B2 | 5/2008 | Matsuda | |
| 7,768,449 B2 | 8/2010 | Gaal et al. | |
| 7,940,740 B2 | 5/2011 | Krishnamurthy et al. | |
| 8,358,243 B2 | 1/2013 | Lin et al. | |
| 8,483,706 B2 | 7/2013 | Edge et al. | |
| 8,660,540 B2 | 2/2014 | Edge et al. | |
| 8,660,574 B2 | 2/2014 | Edge | |
| 8,838,132 B2 | 9/2014 | Prakash et al. | |
| 9,386,408 B2 | 7/2016 | Edge | |
| 9,398,442 B2 | 7/2016 | Edge et al. | |
| 9,435,874 B2 | 9/2016 | Edge et al. | |
| 9,538,445 B2 | 1/2017 | Roh et al. | |
| 9,832,612 B2 | 11/2017 | Edge | |
| 9,867,161 B2 | 1/2018 | Edge et al. | |
| 10,149,275 B2 * | 12/2018 | Edge .................... | G01S 5/0018 |
| 2003/0005085 A1 | 1/2003 | Matsuno | |
| 2003/0022674 A1 | 1/2003 | Shintai et al. | |
| 2003/0036378 A1 | 2/2003 | Dent | |
| 2003/0096624 A1 | 5/2003 | Ormson | |
| 2003/0220765 A1 | 11/2003 | Overy et al. | |
| 2004/0023669 A1 | 2/2004 | Reddy | |
| 2004/0116131 A1 | 6/2004 | Hochrainer et al. | |
| 2004/0137900 A1 | 7/2004 | Varonen et al. | |
| 2004/0248587 A1 | 12/2004 | Niemenmaa | |
| 2005/0020309 A1 | 1/2005 | Moeglein et al. | |
| 2005/0037775 A1 | 2/2005 | Moeglein et al. | |
| 2005/0052318 A1 | 3/2005 | Jendbro et al. | |
| 2005/0148340 A1 | 7/2005 | Guyot | |
| 2005/0162307 A1 | 7/2005 | Kato | |
| 2006/0063534 A1 | 3/2006 | Kokkonen et al. | |
| 2006/0099958 A1 | 5/2006 | Gustafsson et al. | |
| 2006/0293066 A1 * | 12/2006 | Edge .................... | H04W 64/00 455/456.3 |
| 2007/0005335 A1 | 1/2007 | Almstrom | |
| 2007/0014282 A2 | 1/2007 | Mitchell | |
| 2007/0082682 A1 | 4/2007 | Kim et al. | |
| 2007/0135089 A1 | 6/2007 | Edge et al. | |
| 2007/0149213 A1 | 6/2007 | Lamba et al. | |
| 2007/0178913 A1 | 8/2007 | Niemenmaa et al. | |
| 2007/0207772 A1 | 9/2007 | Huber et al. | |
| 2008/0008157 A1 | 1/2008 | Edge et al. | |
| 2008/0032706 A1 | 2/2008 | Sheynblat et al. | |
| 2008/0227463 A1 | 9/2008 | Hizume et al. | |
| 2008/0227465 A1 | 9/2008 | Wachter et al. | |
| 2008/0228654 A1 | 9/2008 | Edge | |
| 2008/0242374 A1 | 10/2008 | Alexander | |
| 2009/0088180 A1 | 4/2009 | Lamance et al. | |
| 2009/0160711 A1 | 6/2009 | Mehta | |
| 2009/0181698 A1 | 7/2009 | Farmer et al. | |
| 2009/0233620 A1 | 9/2009 | Fischer et al. | |
| 2010/0004003 A1 | 1/2010 | Duggal et al. | |
| 2010/0013701 A1 | 1/2010 | Fischer et al. | |
| 2010/0227626 A1 | 9/2010 | Dressler et al. | |
| 2010/0331013 A1 | 12/2010 | Zhang | |
| 2011/0009130 A1 | 1/2011 | Wu | |
| 2011/0039574 A1 | 2/2011 | Charbit et al. | |
| 2011/0039575 A1 | 2/2011 | Castillo et al. | |
| 2011/0117925 A1 | 5/2011 | Sampath et al. | |
| 2012/0015666 A1 | 1/2012 | Horn et al. | |
| 2012/0027110 A1 | 2/2012 | Han et al. | |
| 2012/0040687 A1 | 2/2012 | Siomina et al. | |
| 2012/0040696 A1 | 2/2012 | Siomina et al. | |
| 2012/0083288 A1 | 4/2012 | Siomina | |
| 2012/0147772 A1 | 6/2012 | Kazmi et al. | |
| 2012/0329476 A1 | 12/2012 | Tenny | |
| 2017/0135064 A1 | 5/2017 | Edge et al. | |
| 2019/0069269 A1 | 2/2019 | Edge | |

FOREIGN PATENT DOCUMENTS

| | | |
|---|---|---|
| CN | 101009942 A | 8/2007 |
| CN | 101120265 A | 2/2008 |
| CN | 101366301 A | 2/2009 |
| EP | 2045613 A1 | 4/2009 |
| EP | 2278842 A1 | 1/2011 |
| GB | 2382270 B | 6/2006 |
| JP | 2003204573 A | 7/2003 |
| JP | 2003204574 A | 7/2003 |
| JP | 2003209869 A | 7/2003 |
| JP | 2004104349 A | 4/2004 |
| JP | 2004516479 A | 6/2004 |
| JP | 2004279409 A | 10/2004 |
| JP | 2005086629 A | 3/2005 |
| JP | 2005207888 A | 8/2005 |
| JP | 2006521552 A | 9/2006 |
| JP | 2012531583 A | 12/2012 |
| JP | 2014503163 A | 2/2014 |
| KR | 20070039850 A | 4/2007 |
| RU | 2107925 C1 | 3/1998 |
| RU | 2263412 C2 | 3/2004 |
| RU | 2316152 C2 | 1/2008 |
| WO | 9427160 A1 | 11/1994 |
| WO | 0152569 A1 | 7/2001 |
| WO | 0172060 A1 | 9/2001 |
| WO | 0250562 A1 | 6/2002 |
| WO | 03007633 A1 | 1/2003 |
| WO | 03034765 A1 | 4/2003 |
| WO | 2004086080 A1 | 10/2004 |
| WO | 2005004527 A1 | 1/2005 |
| WO | 2007025143 A1 | 3/2007 |
| WO | 2007035736 A2 | 3/2007 |
| WO | 2007056738 A2 | 5/2007 |
| WO | 2007082038 A1 | 7/2007 |
| WO | 2008016901 A2 | 2/2008 |
| WO | 2008085439 A1 | 7/2008 |
| WO | 2008089288 A2 | 7/2008 |
| WO | 2008112819 A2 | 9/2008 |
| WO | 2009036205 A1 | 3/2009 |
| WO | 2009082728 A2 | 7/2009 |
| WO | 2009124206 A2 | 10/2009 |
| WO | 2009129344 | 10/2009 |
| WO | 2010008682 A1 | 1/2010 |
| WO | 2010009439 A1 | 1/2010 |
| WO | 2010151217 A2 | 12/2010 |
| WO | 2011019917 A1 | 2/2011 |
| WO | 2012099514 A1 | 7/2012 |

OTHER PUBLICATIONS

3GPP TS 25.331 V8.1.0 (Dec. 2007); Release 8, 3rd Generation Partnership Project:Sections 8.4, 8,5.7, 10.2.4, 10.2.17, 10.2.18, 10.2.19, 10.3.3,45, 10,3.3.45a, 10.3.7, 10.3.8, 14.7 of pages 1through 1471.

(56) References Cited

OTHER PUBLICATIONS

3GPP TS 44.031 V7.8.0 Mar. 2008; 3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP), (Release 7), Mar. 2008.
3GPP2 C.S0022-0, Version 3.0, 3rd Generation Partnership Project 2 "3GPP2", "Position Determination Service Standard for Dual Mode Spread Spectrum Systems," Feb. 16, 2001.
3GPP2 C.S0022-A, Version 1.0, (TIA:IS-801-A), Position Determination Service for cdma2000 Spread Spectrum Systems, Mar. 2004.
"Secure User Plane Location Architecture; Draft Version 2.0, Mar. 18, 2008, OMA-AD-SUPL-V2_0-20080318-D; Open Mobile Alliance," Internet Citation, Mar. 18, 2008, pp. 1-57, XP007912186.
European Search Report—EP16192269—Search Authority—The Hague—dated Apr. 26, 2017.
International Search Report and Written Opinion—PCT/US2010/031923, International Search Authority—European Patent Office—dated Oct. 20, 2010.
Motorola: "Positioning Support for LTE Rel-9—RAN1 Specific Issues," 3GPP Draft; R1-090321—Positioning Support for LTE Rel-9, 3rd Generation Partnership Project (3GPP), Mobile Competence Centre, Jan. 11-16, 2008, retrieved on Jan. 8, 2009, XP050318233.
Nord J., et al., "An Architecture for Location Aware Applications," System Sciences, 2002, HICSS, Proceedings of the 35th Annual Hawaii International Conference on IEEE, vol. 9, Jan. 7, 2002, IEEE, pp. 293-298, XP010587713, URL: http://pure.ltu.se/portal/files/113899/artikel.pdf.
Orville R.E., "Development of the National Lightning Detection Network," BAMS, Feb. 2008, 11 pages.
Qualcomm Europe: "LCS Control Plane Alternatives for EPS", 3GPP Draft; S2-085599 (LCS Control Plane Solution for EPS), 3rd Generation Partnership Project (3GPP), Mobile Competence Centre ; 650, Route Des Lucioles ; F-06921 Sophia-Antipolis Cedex ; France, vol. SA WG2, No. Sophia Antipolis, France; Aug. 25, 2008-Aug. 29, 2008, Aug. 19, 2008 (Aug. 19, 2008), XP050628859, [retrieved on Aug. 19, 2008] * chapter 1.1 chapters 10.2, 10.3 figures 22, 23 .
Sayed A.H., "Network-Based Wireless Location", IEEE Signal Processing Magazine, 2005, pp. 24-40, URL: http://WWW.ee.ucla.edu/-tarighat/pdf/spm_05_Loation.pdf.
Taiwan Search Report—TW099112560—TIPO—dated Jan. 27, 2013.
Taiwan Search Report—TW099112560—TIPO—dated Mar. 12, 2013.
Taiwan Search Report—TW103117341—TIPO—dated Nov. 29, 2015.
"Userplane Location Protocol; Draft Version 2.0, Mar. 14, 2008; OMA-TS-ULP-V2_0-20080314-D, Open Mobile Alliance," Internet Citation, Mar. 14, 2008, pp. 1-24, XP007912187.
Wirola L., et al., "Requirements for the next generation standardized location technology protocol for location-based services", Journal of Global Positioning Systems, 2008, pp. 91-103, vol. 7 (2), http://www.gnss.com.au/JoGPS/v7n21JoGPS_v7n2p91-103.pdf.
European Search Report—EP19208339—Search Authority—The Hague—dated Jan. 17, 2020.

* cited by examiner

METHOD AND APPARATUS FOR SUPPORTING POSITIONING FOR TERMINALS IN A WIRELESS NETWORK

This is a continuation application of U.S. patent application Ser. No. 15/411,244, filed Jan. 20, 2017, which is a continuation application of U.S. patent application Ser. No. 15/227,766, filed Aug. 3, 2016, which is a continuation application of U.S. patent application Ser. No. 12/763,962, filed Apr. 20, 2010, which claims the benefit of priority to U.S. Provisional Patent Application Ser. No. 61/171,398, entitled "LPP Generic Capabilities," filed Apr. 21, 2009, U.S. Provisional Patent Application Ser. No. 61/172,719, entitled "LPP Stage 2," filed Apr. 25, 2009, U.S. Provisional Patent Application Ser. No. 61/218,929, entitled "LPP," filed Jun. 20, 2009, U.S. Provisional Patent Application Ser. No. 61/234,282, entitled "LPP," filed Aug. 15, 2009, and Provisional Patent Application Ser. No. 61/247,363, entitled "LPP," filed Sep. 30, 2009, each of which is assigned to the Assignee hereof and expressly incorporated herein by reference.

BACKGROUND

I. Field

The present disclosure relates generally to communication, and more specifically to techniques for supporting positioning for terminals in a wireless network.

II. Background

It is often desirable, and sometimes necessary, to know the location of a terminal, e.g., a cellular phone. The terms "location" and "position" are synonymous and are used interchangeably herein. For example, a location services (LCS) client may desire to know the location of the terminal and may communicate with a network server in order to request for the location of the terminal. The network server and the terminal may then exchange messages, as necessary, to obtain a location estimate for the terminal. The network server may then return the location estimate to the LCS client.

Different terminals may operate in different scenarios and may have different capabilities with regard to positioning. Positioning refers to a functionality that determines a geographical location of a target terminal. It may be desirable to flexibly support positioning for terminals with different capabilities.

SUMMARY

Techniques for supporting positioning for a terminal (sometimes referred to herein as a target device) in a wireless network are described.

In one aspect, a method for positioning a target device includes receiving a Request Location Information message that indicates at least one positioning method from a plurality of supported positioning methods. The Request Location Information message comprises common parameters that are applicable to all positioning methods indicated in the Request Location Information message. The common parameters comprise a quality-of-service (QoS), an indication of whether periodic location information is requested, an indication of whether triggered location information is requested, or any combination thereof. The method further includes performing positioning in response to the Request Location Information message.

In one aspect, an apparatus for positioning a target device includes at least one processing unit and a memory coupled to the at least one processing unit. The memory stores instructions that when executed by the at least one processing unit cause the at least one processing unit to receive a Request Location Information message that indicates at least one positioning method from a plurality of supported positioning methods. The Request Location Information message comprises common parameters that are applicable to all positioning methods indicated in the Request Location Information message. The common parameters comprise a quality-of-service (QoS), an indication of whether periodic location information is requested, an indication of whether triggered location information is requested, or any combination thereof. The instructions further cause the at least one processing unit to perform positioning in response to the Request Location Information message.

In one aspect, a non-transitory computer-readable medium stores instructions for positioning a target device. The instructions when executed by the one or more processors cause the one or more processors to receive a Request Location Information message that indicates at least one positioning method from a plurality of supported positioning methods. The Request Location Information message comprises common parameters that are applicable to all positioning methods indicated in the Request Location Information message. The common parameters comprise a quality-of-service (QoS), an indication of whether periodic location information is requested, an indication of whether triggered location information is requested, or any combination thereof. The instructions further cause the one or more processors to perform positioning in response to the Request Location Information message.

Various aspects and features of the disclosure are described in further detail below.

DETAILED DESCRIPTION

Figure 1:
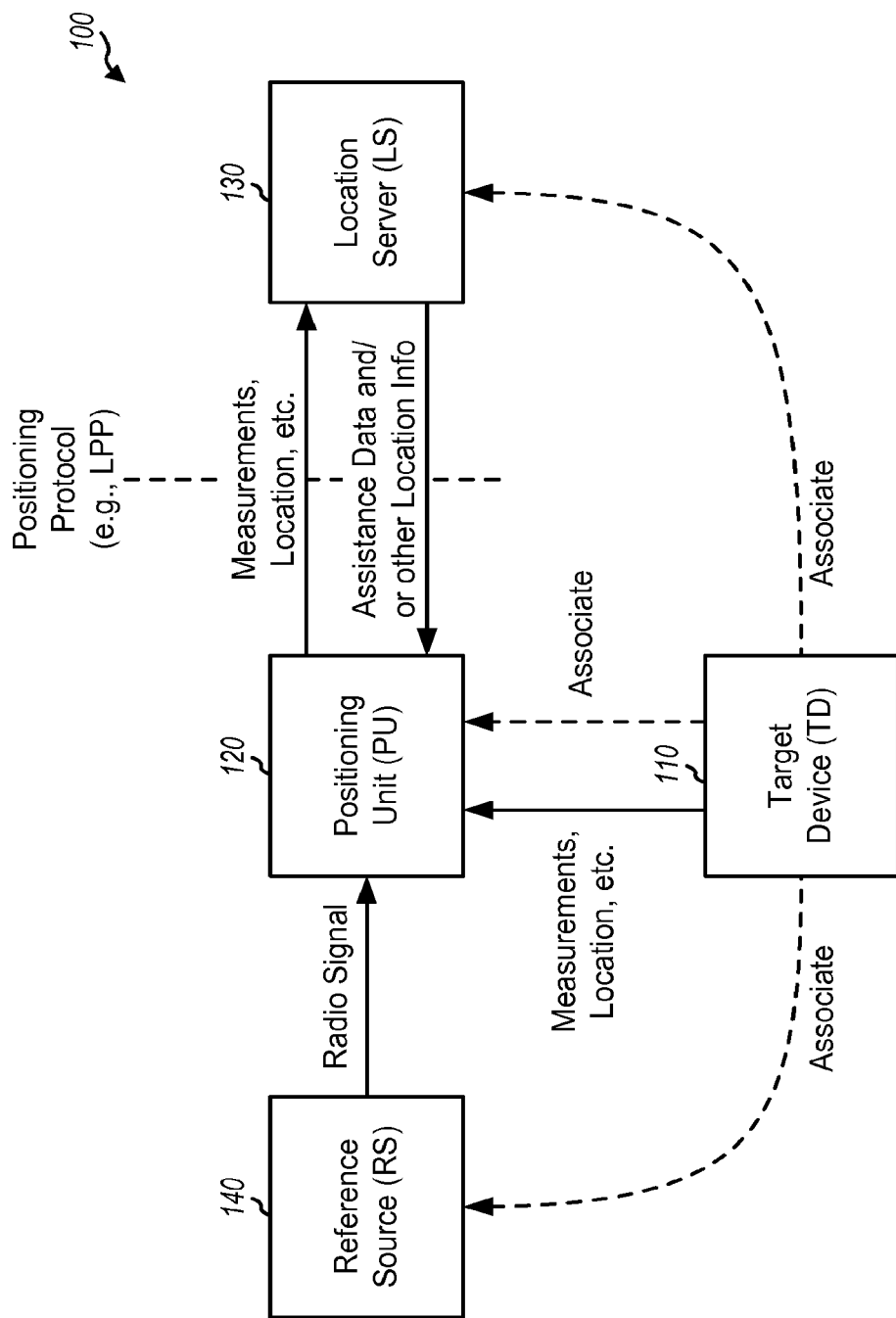
FIG. 1 shows a diagram of an exemplary deployment supporting positioning.

FIG. 1 shows a diagram of an exemplary deployment 100 supporting positioning. A target device (TD) 110 is an entity whose location is to be determined. Target device 110 may be stationary or mobile and may also be referred to as a terminal, a mobile station, a user equipment (UE), an access terminal, a SUPL enabled terminal (SET) in Secure User Plane Location (SUPL) from Open Mobile Alliance (OMA), a subscriber unit, a station, etc. Target device 110 may be a cellular phone, a personal digital assistant (PDA), a wireless device, a wireless modem, a wireless router, a laptop computer, a telemetry device, a tracking device, etc. Target device 110 may communicate with one or more base stations in a wireless network. Target device 110 may also communicate peer-to-peer with other terminals.

A reference source (RS) 140 is an entity that transmits a signal (e.g., a radio signal) that can be measured to support positioning. Reference source 140 may be a satellite in a Satellite Positioning System (SPS), which may be the United States Global Positioning System (GPS), the European Galileo system, the Russian GLONASS system, or some other SPS. Reference source 140 may also be a base station in a wireless network. A base station may also be referred to as an access point, a Node B, an evolved Node B (eNB), etc. A wireless network may be a Global System for Mobile Communications (GSM) network, a Wideband Code Division Multiple Access (WCDMA) network, a General Packet Radio Service (GPRS) access network, a Long Term Evolution (LTE) network, a CDMA 1X network, a High Rate Packet Data (HRPD) network, an Ultra Mobile Broadband (UMB) network, a wireless local area network (WLAN), etc. GSM, WCDMA, GPRS, and LTE are different radio technologies defined by an organization named "3rd Generation Partnership Project" (3GPP). CDMA 1X, HRPD and UMB are different radio technologies defined by an organization named "3rd Generation Partnership Project 2" (3GPP2). Reference source 140 may also be a broadcast station in a broadcast network, which may be a television network, a digital broadcast network, etc. Reference source 140 may also be part of a terminal, e.g., target device 110. In general, one or more signals from one or more reference sources may be measured to determine the location of target device 110. Only one reference source 140 is shown in FIG. 1 for simplicity. The location of a reference source may be known or can be ascertained and may be used for positioning of target device 110.

A positioning unit (PU) 120 is an entity that can measure signals from one or more reference sources, such as reference source 140. Positioning unit 120 may also be able to compute a location estimate for target device 110 based on measurements obtained by positioning unit 120. Positioning unit 120 may be part of target device 110, or a separate device, or part of some other entity. The other entity may be another terminal, a base station, a specialized location measurement unit (LMU) in a wireless network, etc.

A location server (LS) 130 is an entity that can receive positioning information for a target device and determine location information for the target device. In general, positioning information may be any information used to support positioning. For example, positioning information may comprise measurements, a coarse location estimate, etc. Location information may be any information related to the location of a target device. For example, location information may comprise assistance data for making measurements of signals for positioning, a final location estimate for the target device, etc. Location server 130 may communicate with positioning unit 120, receive positioning information from positioning unit 120, and provide location information (e.g., assistance data) to positioning unit 120. Location server 130 may also compute a location estimate for target device 110 based on measurements received from positioning unit 120 and provide the location estimate to positioning unit 120. Location server 130 may reside in any one of a plurality of entities. For example, location server 130 may be a Serving Mobile Location Center (SMLC), a Standalone SMLC (SAS), an Evolved SMLC (E-SMLC), a SUPL Location Platform (SLP), a Position Determining Entity (PDE), etc. Location server 130 may also be part of a terminal, e.g., part of target device 110. In one design, location server 130 may communicate with other entities (e.g., positioning unit 120) via a common positioning protocol regardless of where location server 130 resides. The common positioning protocol may be LTE Positioning Protocol (LPP) used in LTE or some other positioning protocol.

FIG. 1 shows four generic entities that can support positioning for target device 110. Various configurations may be supported by the entities shown in FIG. 1. In one design, target device 110 and positioning unit 120 may be co-located. In this design, target device 110 may measure one or more signals from one or more reference sources for positioning of target device 110. In another design, target device 110 and reference source 140 may be co-located. In this design, target device 110 may transmit a signal that may be measured and used for positioning of the target device. In yet another design, target device 110 may be co-located with location server 130. In this design, target device 110 may receive measurements from positioning unit 120 and may perform positioning for target device 110 based on the measurements. In general, target device 110 may support positioning unit 120 and/or reference source 140 in order to measure other signals or have its own signal measured. Other configurations may also be supported by the entities shown in FIG. 1. For example, positioning unit 120 and location server 130 may be co-located. As another example, reference source 140 and location server 130 may be co-located.

Figure 2A:
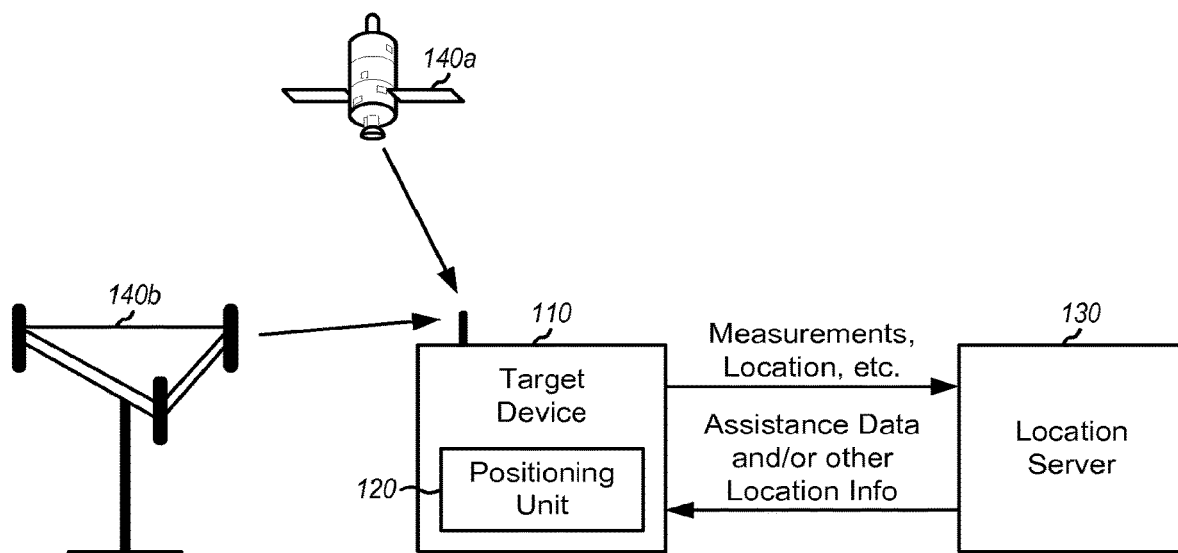
FIG. 2A shows a configuration supporting terminal-assisted and terminal-based positioning methods.

FIG. 2A shows a configuration supporting terminal-assisted and terminal-based positioning methods. In this configuration, positioning unit 120 is co-located with target device 110. Positioning unit 120 may measure signals from reference sources such as a satellite 140a, a base station 140b, etc. Positioning unit 120 may send measurements and/or other information (e.g., a coarse or a fine location estimate) to location server 130. Location server 130 may determine location information (e.g., assistance data) and may send the location information to positioning unit 120 (e.g., to assist positioning unit 120 to measure signals and possibly obtain a location estimate). Location server 130 may also determine a location estimate for target device 110 based on measurements and/or other information received from positioning unit 120. Location server 130 may forward the location estimate to some external client (not shown in FIG. 2A) and/or to target device 110. The configuration in FIG. 2A may be used for terminal-assisted and terminal-based positioning methods such as assisted GNSS (A-GNSS), observed time difference (OTD), enhanced observed time difference (E-OTD), observed time difference of arrival (OTDOA), advanced forward link trilateration (A-FLT), etc.

Figure 2B:
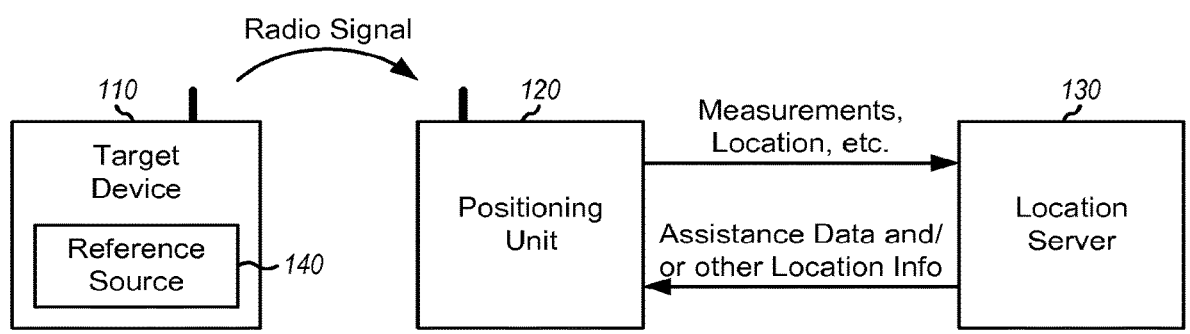
FIG. 2B shows a configuration supporting network-based positioning methods.

FIG. 2B shows a configuration supporting network-based positioning methods. In this configuration, reference source 140 is co-located with target device 110, and positioning unit 120 is external to target device 110. Positioning unit 120 may measure a signal from target device 110. Positioning unit 120 may also receive measurements made by target device 110 for other reference sources (not shown in FIG. 2B). The measurements from target device 110 may be used to support handover of target device 110 and/or for other purposes. Positioning unit 120 may send the measurements and/or other information to location server 130. Location server 130 may determine location information (e.g., assistance data) and may send the location information to positioning unit 120 (e.g., to assist positioning unit 120 to measure signals from reference source 140). Location server 130 may also determine a location estimate for target device 110 based on measurements and/or other information received from positioning unit 120. Location server 130 may forward the location estimate to some external client (not shown in FIG. 2B) and/or to target device 110. The configuration in FIG. 2B may be used for network-based positioning methods such as enhanced cell identity (E-CID), uplink time difference of arrival (U-TDOA), etc.

For simplicity, FIGS. 2A and 2B show one positioning unit 120 and one or more reference sources 140. In general, any number of positioning units may measure signals from any number of reference sources and may send their measurements to location server 130. Target device 110 may act as a reference source for some measurements and/or as a positioning unit for other measurements.

FIGS. 2A and 2B show two configurations supporting non peer-to-peer (P2P) positioning. Non-P2P positioning may occur when reference source 140, positioning unit 120, and location server 130 are not co-located with (e.g., are not part of) any terminal that is not target device 110. For non-P2P positioning, location server 130 may be a network entity or part of target device 110, positioning unit 120 may be part of either target device 110 or a network entity, and reference source 140 may be part of either target device 110 or an external entity (e.g., a satellite, a base station, a broadcast station, etc.)

In one design, P2P positioning may be supported by the entities shown in FIG. 1. P2P positioning may occur when a first terminal assumes the role of location server 130, or positioning unit 120, or reference source 140, or any combination thereof, in order to help position a second terminal that assumes the role of target device 110. Different types of P2P positioning may be supported depending on where location server 130, positioning unit 120, and reference source 140 reside, or whether the first or second terminal assumes the role of each of the location server, the positioning unit, and the reference source.

Figure 2C:
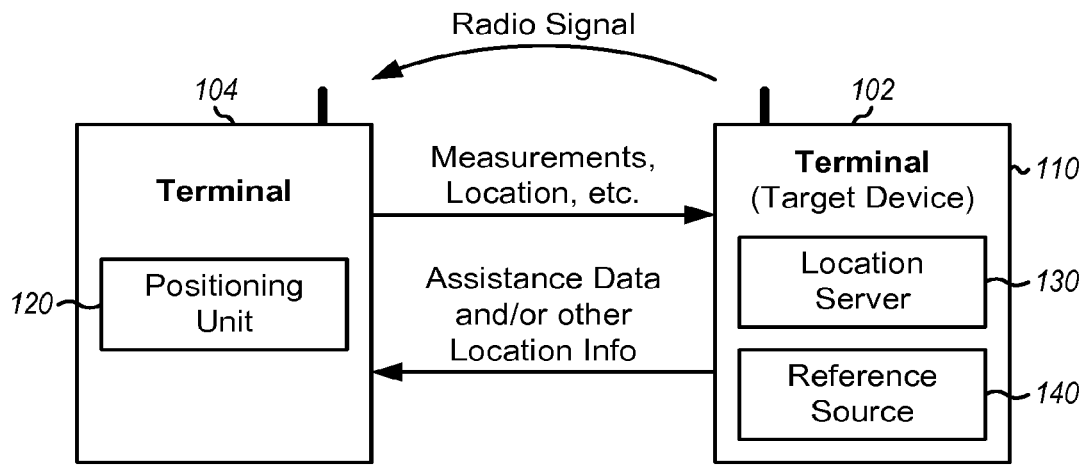
FIGS. 2C and 2D show two configurations supporting peer-to-peer positioning.

FIG. 2C shows a configuration supporting P2P positioning. In this configuration, a first terminal 102 is target device 110 and also assumes the roles of location server 130 and reference source 140. A second terminal 104 communicates peer-to-peer with first terminal 102 and assumes the role of positioning unit 120. Positioning unit 120 in terminal 104 may measure a signal from reference source 140 in terminal 102 and may send measurements and possibly other information to location server 130 in terminal 102. Location server 130 may determine location information (e.g., assistance data) and may send the location information to positioning unit 120 (e.g., to assist positioning unit 120 to measure signals from reference source 140). Location server 130 may also determine a location estimate for target device 110 based on measurements and/or other information received from positioning unit 120. Location server 130 may forward the location estimate to some external client (not shown in FIG. 2C) and/or pass the location estimate to some entity (e.g., an application) in target device 110.

For simplicity, FIG. 2C shows terminal 102 communicating with one peer terminal 104. In general, terminal 102 may communicate with any number of peer terminals and may request measurements from one or more peer terminals. Each peer terminal may act as a positioning unit and may measure the signal from terminal 102. Each peer terminal may send measurements and its location to terminal 102. The location of terminal 102 may be determined based on the measurements from all peer terminals and their reported locations.

Figure 2D:
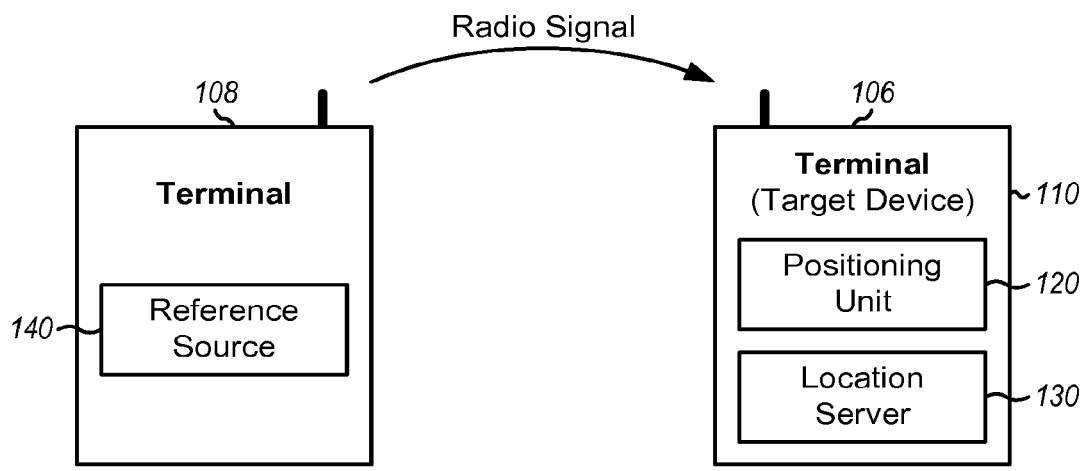

FIG. 2D shows another configuration supporting P2P positioning. In this configuration, a first terminal 106 is target device 110 and also assumes the roles of positioning unit 120 and location server 130. A second terminal 108 communicates peer-to-peer with first terminal 106 and assumes the role of reference source 140. Positioning unit 120 in terminal 106 may measure a signal from reference source 140 in terminal 108 and may send measurements and/or other information to location server 130 in terminal 106. Location server 130 may also receive the location of terminal 108. Location server 130 may determine location information (e.g., assistance data) and may transfer the location information to positioning unit 120 (e.g., to assist positioning unit 120 to measure signals from reference source 140) in terminal 108. Location server 130 may also determine a location estimate for target device 110 based on measurements and/or other information received from positioning unit 120. Location server 130 may forward the location estimate to some external client (not shown in FIG. 2D) and/or pass the location estimate to some entity (e.g., an application) in target device 110.

For simplicity, FIG. 2D shows terminal 106 communicating with one peer terminal 108. In general, terminal 106 may communicate with any number of peer terminals and may make measurements for one or more peer terminals. Each peer terminal may act as a reference source whose signal may be measured by terminal 106. Each peer terminal may send its location to terminal 106. The location of terminal 106 may be determined based on the measurements for all peer terminals and their reported locations.

For P2P positioning, the role of positioning unit 120 and location server 130 may be assumed by different terminals. To avoid ambiguity, a terminal initiating a location transaction may specify which end/terminal of the transaction will assume the role of each of the location server and the positioning unit. Each terminal may then assume the role specified by the initiating terminal.

P2P positioning may be used to position a terminal, as described above. P2P positioning may also be used to help position an access point for a femto cell, which may also be referred to as a home Node B (HNB), a home eNB (HeNB), etc. In this case, the access point may be treated like a terminal.

In one design, generic positioning methods (GPMs) may be used to support positioning of target devices. A generic positioning method is a positioning method that supports positioning for a target device with different types of reference sources using the same type of measurements and location computation procedure.

Table 1 lists some generic positioning methods that may be supported and provides a short description for each generic positioning method.

TABLE 1

Generic Positioning Methods

| GPM | Description |
| --- | --- |
| Uplink or Downlink Time Difference Based GPM | Employ time of arrival differences between either (i) signal of the same reference source/target device measured at different positioning units (for uplink) or (ii) signals of different reference sources measured by a positioning unit/target device (for downlink). Use trilateration method to compute location of target device. |

TABLE 1-continued

Generic Positioning Methods

| GPM | Description |
| --- | --- |
| Propagation Time Based GPM | Employ measurements of propagation delay from a reference source to a positioning unit with one of these entities being at a known location and the other entity being co-located with a target device. Use trilateration method to compute location. |
| Direction Based GPM | Employ measurements of signal direction from a reference source to a positioning unit, where the reference source may be part of the target device and the positioning unit may be part of a network. Use triangulation methods to compute location. |
| Path Loss Based GPM | Employ measurements of signal strength of a reference source at a positioning unit to estimate distance between the reference source and the positioning unit based on signal attenuation. Can use trilateration method to compute location. |
| RF Pattern Matching GPM | Employ measurements of signal strength of either (i) the same reference source co-located with a target device at different positioning units or (ii) different network-based reference sources at the same positioning unit co-located with the target device. Employ predetermined RF signal strength patterns over small geographic areas to determine the most likely location of the target device based on pattern matching. |

Detection of the presence of a particular reference source, without measurement of a signal from the reference source, may also be included in one or more generic positioning methods listed in Table 1 to support cell ID or WLAN-based positioning. A combination of generic positioning methods may also be used for positioning, e.g., to improve accuracy.

In one design, a set of positioning method classes (PMCs) may be defined. A PMC may include a set of positioning methods defined by applying one or more generic positioning methods to a given type of reference source. Different types of reference sources may be used for positioning and may include LTE eNBs, LTE-capable terminals, CDMA 1X base stations, IX-capable terminals, etc. For a given type of reference source, one or more specific positioning methods may be defined by applying one or more generic positioning methods to this reference source. For example, A-GPS may be obtained by applying downlink time difference based GPM to GPS reference sources, U-TDOA may be obtained by applying uplink time difference based GPM to a GSM reference source, E-CID may be obtained by applying direction based and/or RF pattern matching GPM to an LTE reference source, etc.

Each PMC may include one or more positioning methods. The positioning methods in each PMC may be related because they employ measurements of the same type of reference source. These measurements may overlap, and the same measurements may be usable for different positioning methods within the PMC. Assistance data used to enable measurements and/or location computation for positioning methods in the same PMC may also overlap (e.g., if the measurements also overlap). Overlapping measurements and assistance data may be used to more efficiently support several positioning methods within a PMC using a reduced set of measurements and assistance data. For example, measurements and assistance data that apply to multiple positioning methods may be transferred only once instead of for each positioning method.

Figure 3:
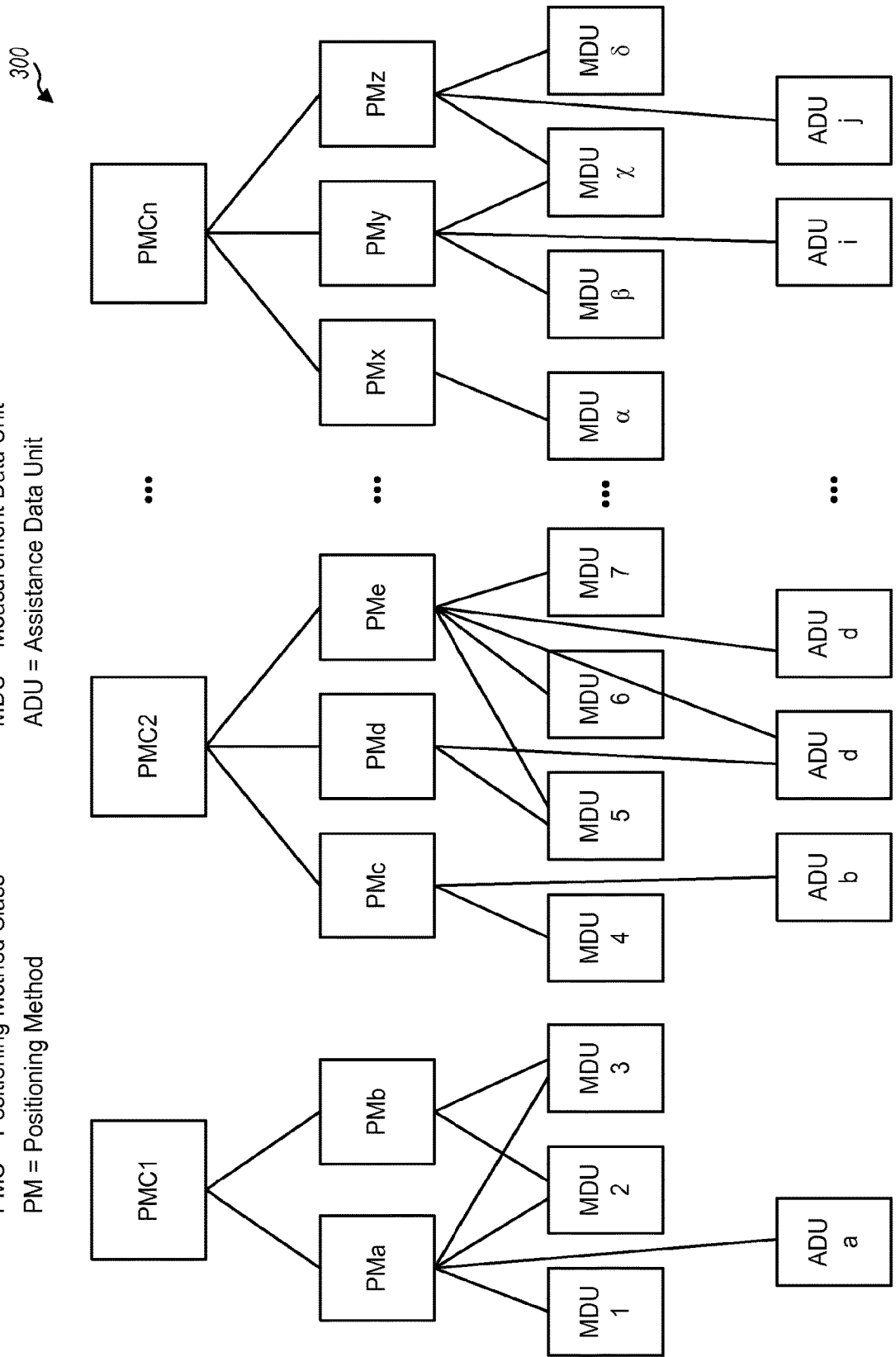
FIG. 3 shows a hierarchical structure for a positioning protocol.

FIG. 3 shows a hierarchical structure 300 for a positioning protocol, which may be used by location server 130. The positioning protocol may support a set of PMCs, which may be defined for different types of reference sources as described above. Each PMC may include a set of one or more positioning methods defined for a particular type of reference source. For example, an A-GNSS PMC may include A-GPS and A-Galileo positioning methods, a downlink LTE PMC may include OTDOA and E-CID positioning methods, an uplink LTE PMC may include E-CID positioning method, etc. Other PMCs may be defined for downlink WCDMA, uplink WCDMA, downlink CDMA 1X, uplink CDMA 1X, downlink WiMAX, uplink WiMAX, 802.11 Wi-Fi, sensors, etc.

A positioning method (PM) may be used to determine the location of a target device and may be associated with a particular generic positioning method and/or a particular reference source type. Each positioning method may support all or a subset of all measurements and assistance data applicable for its PMC. The set of measurements and assistance data supported by a given positioning method may be mandatory, or optional, or conditional for any positioning unit or location server supporting that positioning method.

A positioning unit or a location server that supports a given PMC may support at least one positioning method in that PMC. A positioning unit or a location server that supports a given positioning method may support all mandatory (and possibly optional and/or conditional) measurements and assistance data for that positioning method.

In one design, a set of measurement data units (MDUs) may be defined for all supported positioning methods. An MDU may be a collection of one or more items of data that may be used to report measurements and their attributes. An MDU may be applicable for one or more positioning methods within a particular PMC. An MDU may apply to multiple positioning methods and may be efficiently sent once to provide measurement data to these positioning methods (instead of separately for each positioning method). For example, MDU 2 in FIG. 3 may apply to positioning methods PMa and PMb and may be sent once for these two positioning methods. An MDU may apply to one reference source and may be repeated for multiple reference sources of the same type, e.g., to provide or request pseudo-ranges for multiple satellites, timing differences for multiple base stations, etc.

MDUs may enable capabilities of location servers and positioning units to be defined, e.g., in terms of which MDUs a location server or positioning unit supports. MDUs may also enable location server 130 to request and positioning unit 120 to provide measurement data in a flexible and precise manner. Location server 130 may indicate certain characteristics (e.g., accuracy and response time) of an MDU when requesting it from positioning unit 120. Positioning unit 120 may indicate the characteristics (e.g., accuracy) of an MDU that it is able to provide (e.g., via its capabilities).

In one design, a set of assistance data units (ADUs) may be defined for all supported positioning methods. An ADU may be a collection of one or more items of data that may be used to assist measurements. An ADU may be applicable for one or more positioning methods within a particular PMC. An ADU may apply to multiple positioning methods and may be efficiently sent once to provide assistance data to these positioning methods (instead of separately for each positioning method). For example, ADU d in FIG. 3 may apply to positioning methods PMd and PMe and may be sent once for these two positioning methods. An ADU may apply to one reference source and may be repeated for multiple reference sources of the same type, e.g., to provide or request ephemeris data for multiple satellites within the same SPS, real time differences (RTDs) for multiple base stations of the same access type, etc.

ADUs may enable capabilities of location servers and positioning units to be defined, e.g., in terms of which ADUs a location server or positioning unit supports. ADUs may also enable positioning unit 120 to request and location server 130 to provide assistance data in a flexible and precise manner. Positioning unit 120 may indicate certain characteristics of an ADU (e.g., lifetime or accuracy for GPS ephemeris data) when requesting it from location server 130.

In one design, PMCs, positioning methods, MDUs, and/or ADUs may be individually identified. This identification may facilitate capabilities, specific measurements, and specific assistance data to be requested and provided. Identification may also be useful to identify the presence of a particular MDU or ADU in a positioning message, to identify a message segment related to a specific positioning method or PMC, etc. The identities of PMCs may be unique across the positioning protocol whereas the identities of positioning methods, MDUs, and ADUs may be unique only for a particular PMC. Different ranges of IDs may be used for identification. For example, PMC ID of 0 may be reserved for possible future signaling applicable to all PMCs, PMC IDs of 1 to 63 may be used for network-based (uplink) PMCs, PMC IDs of 64 to 127 may be used for terminal-assisted and terminal-based (downlink) PMCs, PMC IDs of 128 to 191 may be used for operator specific positioning methods, PMC IDs of 192 to 254 may be used for vendor specific positioning methods, and PMC ID of 255 may be used to indicate PMC IDs greater than 255, if needed. In general, IDs may be defined in any suitable manner for PMCs, positioning methods, MDUs, and/or ADUs.

In one design, calibration PMCs may be used to provide calibration data to a location server for one or more reference sources. Calibration data may be for (i) signal timing and/or signal strength for base stations, access points, and/or other reference sources, (ii) timing and navigation data for GNSS systems, and/or (iii) other signals and data. Calibration data may be used by a location server to obtain assistance data that can be provided later to a positioning unit to assist it in making measurements to locate a target device. As an example, calibration data that includes transmission timing differences between nearby base stations may be used by a location server to derive assistance data (e.g., including approximate time differences between nearby base stations that a target device would be expected to measure) for downlink time difference positioning methods such as OTDOA. Such assistance data may then be sent later to a position unit co-located in the target device. A calibration PMC (or a calibration positioning method) may support a corresponding normal PMC (or normal positioning method) as described in the example above by helping obtain assistance data for the normal PMC (or normal positioning method) and by helping to compute a location estimate for any positioning method in the normal PMC. For example, a calibration PMC for inter-eNB timing measurement may support a downlink LTE PMC including OTDOA and E-CID positioning methods.

The use of calibration PMCs as part of a common positioning protocol that also supports normal PMCs may allow the common positioning protocol to be used to calibrate reference sources and thereby avoid the need for additional protocols for this purpose. A calibration PMC may not directly support any positioning methods, any ADUs, and positioning of target devices. A calibration PMC may support MDUs, which may be provided by positioning units (e.g., base stations or LMUs) for reference sources applicable to the corresponding normal PMC. The MDUs may be used by the location server to help obtain ADUs for the corresponding normal PMC as well as to help compute a location estimate for the position methods in the corresponding normal PMC.

In one design, location server 130 and target device 110 (or location server 130 and positioning unit 120) may engage in a location session in order to obtain measurements or location, to provide assistance data, and/or for other purposes. A location session may also be referred to as an LPP session, a positioning session, etc. A location session may include one or more transactions, which may also be referred to as LPP transactions, etc. Each transaction may cover a particular operation such as exchange of capabilities, transfer of assistance data, transfer of location information, etc. Each transaction may be assigned a transaction ID, and all messages for that transaction may include the transaction ID in order to link the messages to the same transaction.

In one design, a set of positioning messages may be defined and used for communication between location servers and other entities. The positioning messages may also be referred to as LPP messages, LPP protocol data units (PDUs), etc.

Figure 4A:
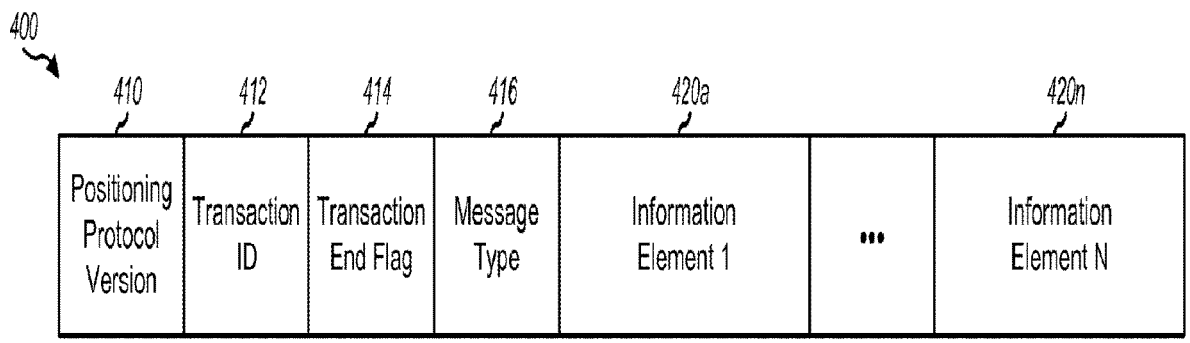
FIG. 4A shows a design of a positioning message.

FIG. 4A shows a design of a positioning message 400. In this design, positioning message 400 includes a positioning protocol version field 410, a transaction ID field 412, a transaction end flag field 414, a message type field 416, and N information elements 420a through 420n, where N may be zero or greater. Field 410 may indicate which version of the positioning protocol is used for a location session and may be included to negotiate the use of the same positioning protocol version by two entities engaging in the location session. An originating entity may set field 410 to the highest version that it supports. A receiving entity may return the highest version that it supports. The negotiated version may be the lower of the two highest versions supported by the two entities.

Field 412 may identify a transaction for which the positioning message applies. Field 412 may be especially pertinent when multiple transactions occur concurrently during the location session. Each transaction may be assigned a unique transaction ID. In one design, an originating entity that initiates a transaction may assign a transaction ID for that transaction. A responding entity may use the same transaction ID when responding to the originating entity. For example, location server 130 may assign transaction IDs to transactions initiated by location server 130, and positioning unit 120 may assign transaction IDs to transactions initiated by positioning unit 120. When more than one location servers are used to position target device 110, each location server may be allocated a different range of transaction IDs that can be assigned by that location server.

Field 414 may indicate whether the sending entity has terminated the transaction. Field 416 may indicate the type of message being sent. A set of message types may be supported as described below, and positioning message 400 may be of the type indicated by field 416.

Fields 420a through 420n may include information that may be dependent on the message type. Each field 420 may carry a positioning data component (PDC) for one PMC or positioning method. Positioning message 400 may include multiple PDCs to efficiently convey information for more than one PMC at a time and to invoke combined/hybrid positioning.

A positioning message may also include different and/or other fields besides the fields shown in FIG. 4A. For example, a positioning message may include a field for session ID, a field to indicate whether the sender is acting as a location server or a positioning unit, etc.

Table 2 lists a set of positioning message types that may be supported in accordance with one design.

TABLE 2

Positioning Message Type

| Message Type | Description |
| --- | --- |
| Request Capabilities | Message to request for capabilities of an entity for positioning protocol and positioning methods. |
| Provide Capabilities | Message to provide capabilities of an entity for positioning protocol and positioning methods. |
| Request Assistance Data | Message to request for assistance data. |
| Provide Assistance Data | Message to provide assistance data. |
| Request Location Information | Message to request for location information. |
| Provide Location Information | Message to provide location information. |

Location server 130 may provide its capabilities when requested by positioning unit 120 or may send its capabilities unilaterally without receiving any request. Similarly, positioning unit 120 may provide its capabilities when requested by location server 130 or may send its capabilities unilaterally without receiving any request. The capabilities of an entity (e.g., location server 130 or positioning unit 120) may include the PMCs and positioning methods supported by that entity and the capabilities of the entity for each supported positioning method (e.g., a list of MDUs that can be sent or received by the entity and/or a list of ADUs that can be sent or received by the entity).

Location server 130 may provide assistance data when requested by positioning unit 120 or may send the assistance data unilaterally without receiving any request. The assistance data may assist positioning unit 120 to make measurements that may be used for positioning of target device 110 or for calibration of reference source 140. Location server 130 may also provide assistance data when the data changes for an ongoing positioning method. This automatic update of assistance data may enable the positioning method to be reset without having to explicitly abort and restart it. For example, target device 110 may change serving cell (e.g., due to handover) during an OTDOA positioning method, and location server 130 may send new assistance data applicable for the new serving cell in order for positioning unit 120 (in target device 110) to obtain and transfer measurements of different neighbor base stations associated with the new serving cell. As another example, positioning unit 120 (e.g., an LMU) may measure data and/or signaling channels transmitted by target device 110 in a particular serving cell for U-TDOA positioning, and target device 110 may change serving cell (e.g., due to handover). Location server 130 may then send new assistance data to positioning unit 120 to enable it to measure different data and/or signaling channels associated with the new serving cell. Having automatic update may be useful in these scenarios.

Positioning unit 120 may send positioning information to location server 130 to support positioning of target device 110 (e.g., for a normal PMC) or determination of assistance data for future positioning (e.g., for a calibration PMC). The positioning information may comprise (i) measurements made by positioning unit 120 within target device 110 for other reference sources (e.g., as shown in FIG. 2A), (ii) measurements made by positioning unit 120 external to target device 110 for reference source 140 in target device 110 (e.g., as shown in FIG. 2B), (iii) a location estimate for target device 110 obtained by positioning unit 120, and/or (iv) other information related to the location of target device 110. Location server 130 may send location information comprising a location estimate for target device 110 to positioning unit 120, e.g., if positioning unit 120 is part of target device 110 and target device 110 is the intended final recipient of the location estimate. For calibration of a reference source, positioning information may comprise measurements made by positioning unit 120 for network-based reference sources (e.g., base stations) and other resources (e.g., satellites).

A positioning message may also include a field for common parameters applicable for all PMCs supported by the positioning message. The common parameters for a Request Capabilities message and a Provide Capabilities message may include a list of supported PMC IDs, PMC versions, etc. The common parameters for a Request Assistance Data message may include an approximate location of a target device, an indication of whether periodic or triggered assistance data is requested and associated parameters, primary access (e.g., a serving cell ID), secondary accesses (e.g., neighboring cell IDs), etc. The common parameters for a Provide Assistance Data message may include an approximate location of a target device, current time, etc. The common parameters for a Request Location Information message may include required quality-of-service (QoS) (e.g., for location, measurement accuracy, and/or response time), an indication of whether periodic or triggered location information is requested and associated parameters, location type for terminal-assisted and/or terminal-based positioning methods, a list of required or preferred PMC IDs and PMC versions, etc. The common parameters for a Provide Location Information message may include a location estimate and accuracy, time, velocity, etc.

Figure 4B:
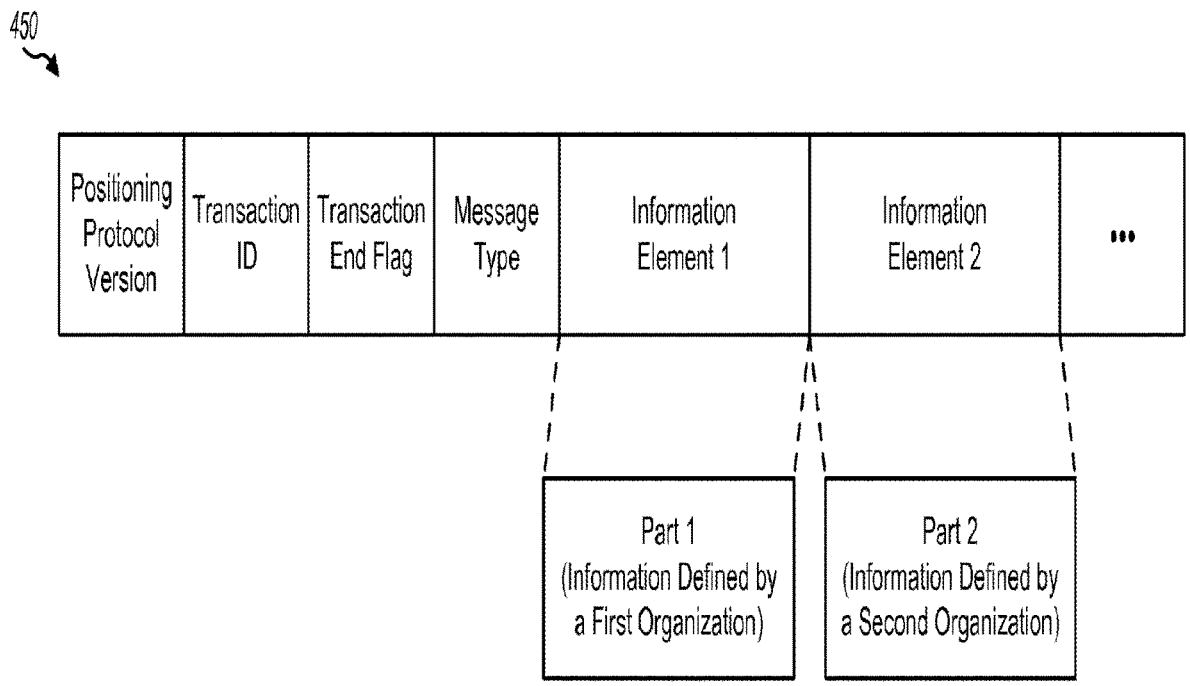
FIG. 4B shows a design of a positioning message with multiple parts defined by different organizations.

FIG. 4B shows a design of a positioning message 450 that includes multiple parts defined by different organizations. Positioning message 450 may include a positioning protocol version field, a transaction ID field, a transaction end flag field, a message type field, and N information elements, as described above for FIG. 4A. In one design, one part may be sent in each information element. For example, a first part may comprise first information for positioning defined by a first organization, a second part may comprise second information for positioning defined by a second organization, etc. An organization may be 3GPP, 3GPP2, OMA, Internet Engineering Task Force (IETF), Institute of Electrical and Electronics Engineers (IEEE), a network operator, an equipment vendor, etc. The multiple parts may be for a particular transaction type, e.g., capability transfer, assistance data transfer, location information transfer, etc. This design may allow an external organization to enhance an existing positioning method or support new positioning methods by defining additional capabilities that may be carried in one or more additional parts of a positioning message.

In one design, several related transactions may be invoked in parallel. For example, positioning unit 120 may be co-located with target device 110 (e.g., as shown in FIG. 2A) and may request for its own location from location server 130, request for assistance data from location server 130, and provide its capabilities to location server 130 to enable location server 130 to obtain its location. As another example, positioning unit 120 may be co-located with target device 110 and may request for its own location from location server 130 and may provide measurements for one or more positioning methods (e.g., E-CID and/or A-GNSS)

to location server 130 to enable location server 130 to derive a location estimate. The messages sent by positioning unit 120 to location server 130 in both examples above may also be combined. As yet another example, location server 130 may request for positioning information from positioning unit 120, which may be co-located with target device 110, and may provide assistance data to positioning unit 120 to help obtain the positioning information.

In one design, multiple positioning messages for multiple transactions may be transported together in one message transaction/exchange. In one design, a single container message may include the multiple positioning messages. For example, the container message may be a predefined positioning message that can carry the multiple positioning messages in multiple information elements, one information element for each individual positioning message. In another design, the multiple positioning messages may be linked and sent separately, either serially or in parallel. A common identifier may be included in each message to enable the separate messages to be associated at a receiving entity. The multiple positioning messages may also be transported together in other manners. The format and content of each positioning message may not be dependent on whether that positioning message is sent alone or with other positioning messages.

A sending entity may send a container message including multiple positioning messages for multiple transactions. A recipient entity may generate individual replies for the multiple transactions and may use the association of the multiple positioning messages to provide more appropriate responses, e.g., by making use of the information contained in all received positioning messages to generate the reply to each received message. The recipient entity may return a container message including multiple positioning messages for the individual replies. Transporting multiple positioning messages together may provide various advantages such as (i) reduce delay and avoid problems due to delivery of positioning messages out of order if sent separately and (ii) ensure that a receiving entity is in possession of the most information needed to process and reply to each received message.

Figure 5:
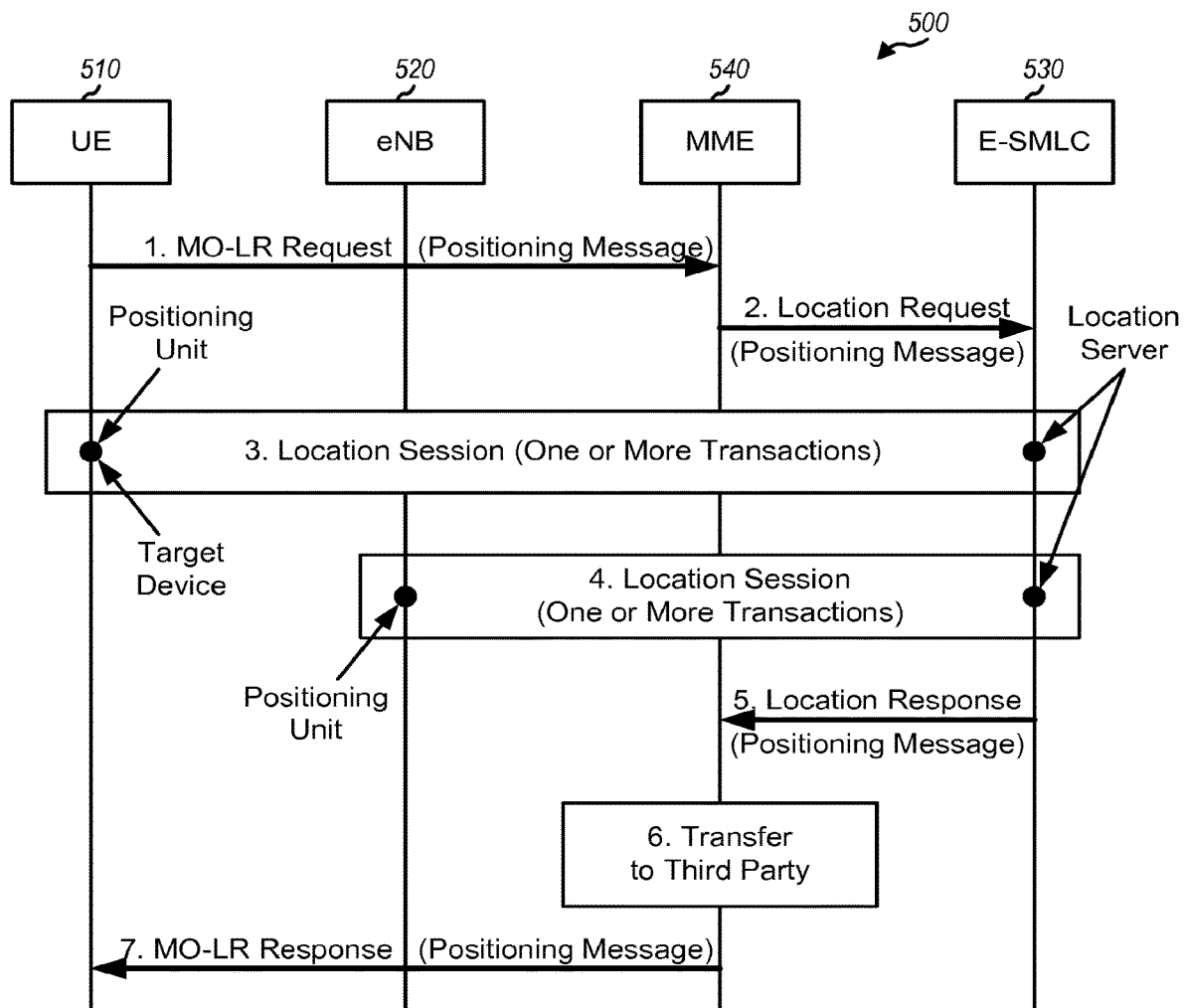
FIG. 5 shows a message flow for a mobile-originated location request service.

FIG. 5 shows a message flow 500 for a mobile-originated location request (MO-LR) service in LTE. An LCS client in a UE 510 or a user of UE 510 may request for location service, e.g., to retrieve the location of UE 510 or to transfer the UE location to a third party. UE 510 may send an MO-LR request message to a Mobility Management Entity (MME) 540 via a serving eNB 520 (step 1). The MO-LR request message may be used as a container message to carry one or more positioning messages to instigate one or more procedures. For example, the MO-LR request message may include a positioning message to provide capabilities of UE 510, a positioning message to request for assistance data, a positioning message to provide measurements, etc. MME 540 may send a location request message to an E-SMLC 530 (step 2). The location request message may include any positioning message received by MME 540 in step 1.

E-SMLC 530 and UE 510 may engage in a location session and may perform one or more transactions (step 3). For this location session, UE 510 may be a target device and a positioning unit, and E-SMLC 530 may be a location server. E-SMLC 530 may instigate one or more transactions to obtain positioning capabilities of UE 510, provide assistance data to UE 510, and/or obtain positioning information from UE 510. After the first positioning message is received from E-SMLC 530, UE 510 may instigate one or more transactions to request for assistance data, to request for further assistance data, etc.

E-SMLC 530 and eNB 520 may engage in a location session and may perform one or more transactions (step 4). For this location session, eNB 520 may be a positioning unit, and E-SMLC 530 may be a location server. E-SMLC 530 may obtain positioning information for UE 510 from eNB 520 via the location session. Steps 3 and 4 may occur in any order or in parallel. E-SMLC 530 may return a location response message to MME 540 (step 5). The location response message may include any location estimate obtained from steps 3 and 4 and/or a final positioning message, which may provide a location estimate if requested by UE 510 in step 1. If UE 510 requested location transfer to a third party, then MME 540 may transfer the location estimate received from E-SMLC 530 to the third party (step 6). MME 540 may send to UE 510 an MO-LR response message that may carry any final positioning message received in step 5 and/or a separate location estimate (step 7).

For control plane location solution, a network entity (e.g., MME 540) may need to request for location service from a location server (e.g., E-SMLC 530) before a location session can occur. For MO-LR service, a target device (e.g., UE 510) may first send an MO-LR request message to the network entity to request for location service. The target device may then wait for a response from the network entity and may thereafter send a first positioning message to the location server. This extra delay may be avoided by having the target device include the first positioning message in the MO-LR request message sent to the network entity. The network entity may then transfer this first positioning message to the location server in the location request message. Subsequent positioning messages may be sent more directly between the target device and the location server without making use of a Non Access Stratum (NAS) layer in which the MO-LR request message belongs. A final positioning message from the location server may be sent either directly to the target device or via an MO-LR response message, which may reduce the total number of messages to transfer.

Figure 6:
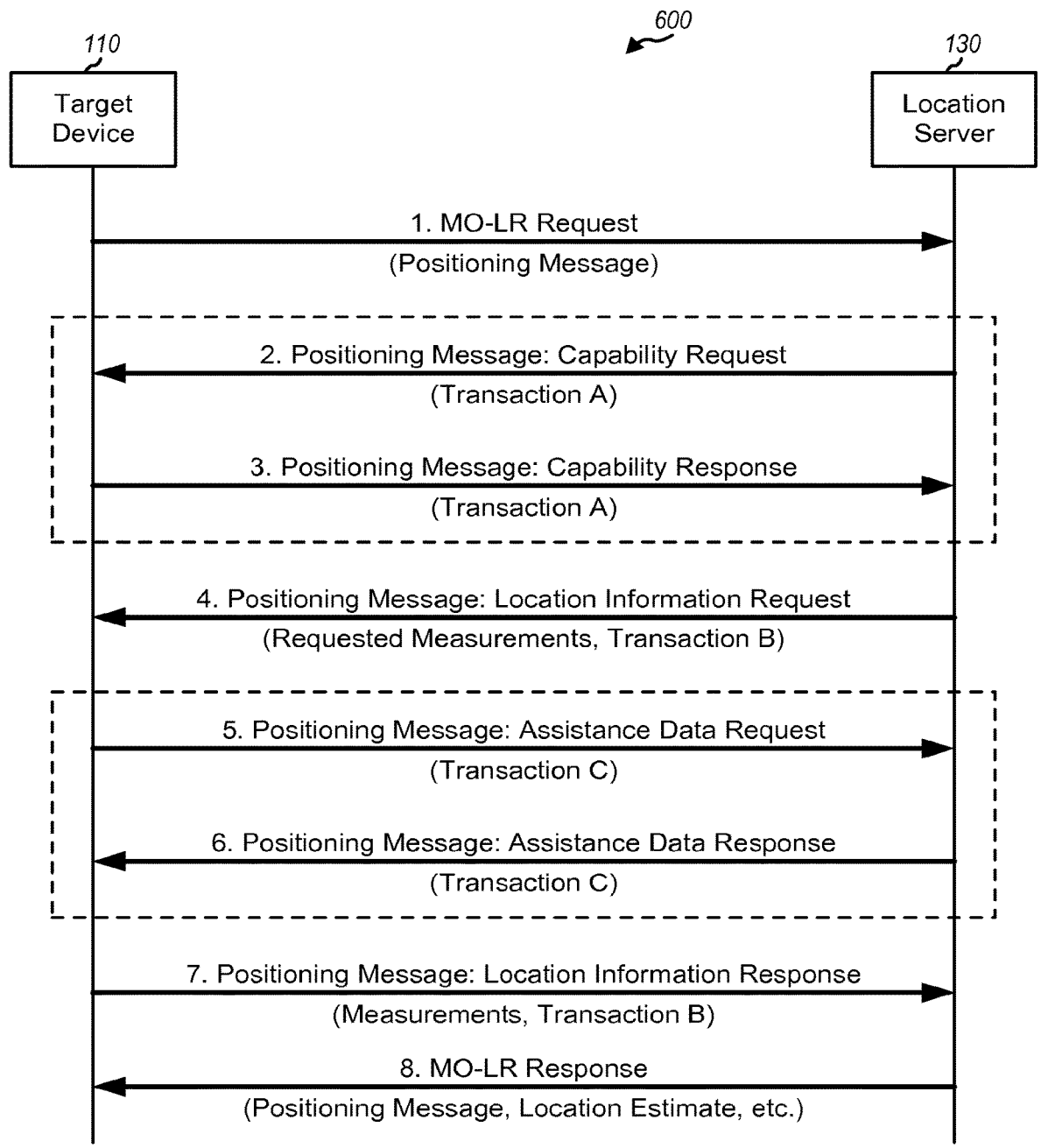
FIG. 6 shows a message flow for a location session with multiple transactions.

FIG. 6 shows a message flow 600 for a location session with multiple transactions. Message flow 600 may be used for the location session in step 3 and/or the location session in step 4 in FIG. 5. Target device 110 may send an MO-LR request message to location server 130 (step 1). The MO-LR request message may carry one or more positioning messages to instigate one or more procedures. A positioning message may include the required QoS, whether triggered or periodic location is requested, and/or other information. Location server 130 may send a positioning message to request for positioning capabilities of target device 110, if the positioning capabilities are not received in step 1 (step 2). Target device 110 may return a positioning message with its positioning capabilities, e.g., supported positioning methods (step 3).

Location server 130 may send a positioning message to a request for positioning information, e.g., location-related measurements for the positioning methods supported by target device 110 (step 4). Target device 110 may send a positioning message to request for assistance data (step 5). Location server 130 may return a positioning message with the requested assistance data (step 6). Location server 130 may also send one or more follow on positioning messages with updated assistance data (not shown in FIG. 6), e.g., when triggered by changes or at a periodic interval. Target device 110 may obtain the positioning information (e.g., measurements) and may send a positioning message with the positioning information (step 7). Target device 110 may also send one or more follow-on positioning messages with updated location information (not shown in FIG. 6), e.g., when triggered by changes or at a periodic interval. Location server 130 may compute a location estimate for target device 110 using the positioning information received in step 7. Location server 130 may then send an MO-LR response message, which may include a positioning message and/or the location estimate, to target device 110 (step 8). Location server 130 may also send one or more follow on positioning messages with updated location estimates (not shown in FIG. 6), e.g., when triggered by certain events, or at a periodic interval, or after receiving further positioning information from the target device, etc.

FIG. 6 shows an exemplary location session with three explicit transactions A, B and C. In general, a location session may include any number of transactions and any type of transaction. Multiple transactions of the same type may also be performed. For example, a transaction to obtain positioning information from a target device to support E-CID positioning may be performed to obtain an approximate location, and a separate A-GNSS associated transaction may be performed in parallel or subsequently to obtain an accurate location.

FIG. 6 shows a message flow for an MO-LR service. A message flow for a mobile-terminated location request (MT-LR) service may be defined with steps 2 through 7 in FIG. 6.

As shown in FIG. 6, a number of transactions may be performed. A transaction may involve a pair of positioning messages exchanged between a positioning unit in a target device 110 and location server 130, as shown in FIG. 6. A transaction may also involve a single positioning message sent unilaterally by one entity. For example, a positioning unit in target device 110 may unilaterally provide its capabilities without receiving a request for capabilities, and location server 130 may unilaterally provide assistance data without receiving a request for assistance data. Multiple positioning messages for multiple transactions may be aggregated and transferred together. For example, the positioning messages in steps 2 and 4 may be transferred together, the positioning messages in steps 3 and 5 may be transferred together, etc.

Figures 7, 8:
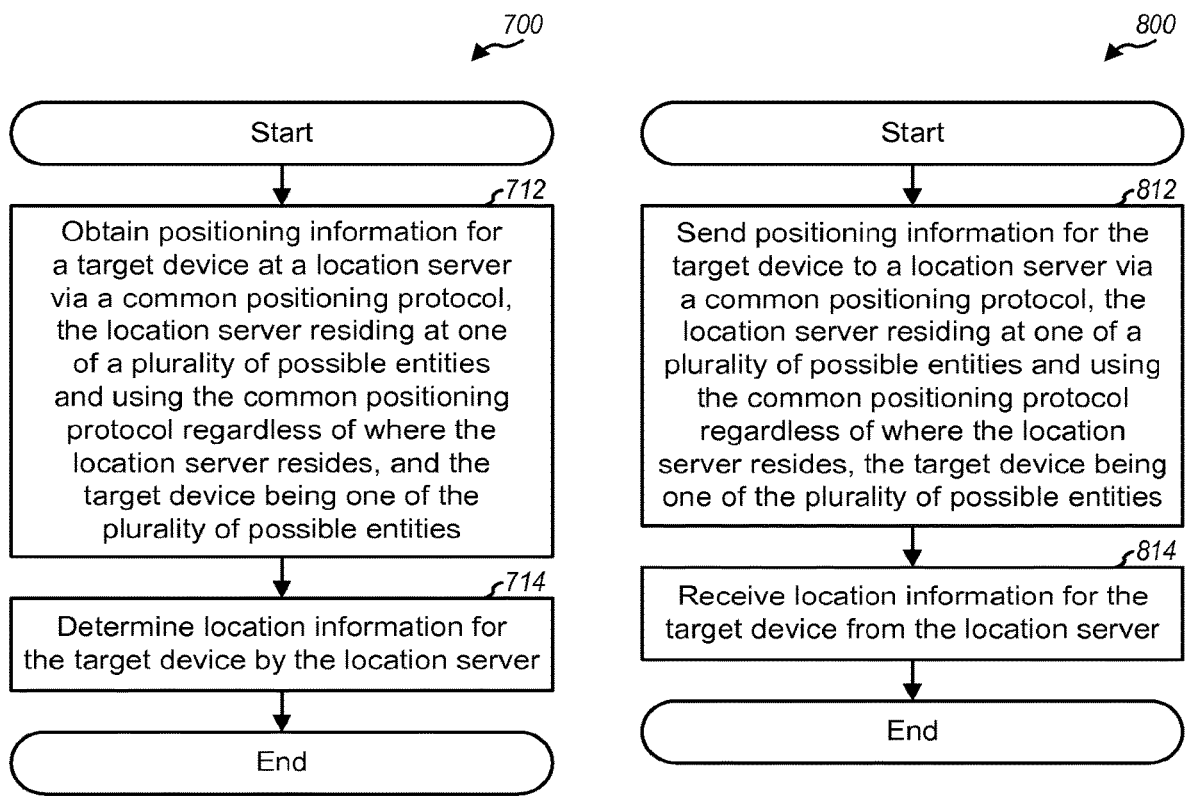
FIGS. 7 to 11 show various processes for supporting positioning.

FIG. 7 shows a design of a process 700 for supporting positioning by a location server. The location server may obtain positioning information for a target device via a common positioning protocol, which may be LPP or some other positioning protocol (block 712). The location server may reside at one of a plurality of possible entities, and the target device may be one of these entities. For example, the location server may reside in a network entity or may be co-located with the target device. The location server may use the common positioning protocol regardless of where it resides and may communicate with other entities via the common positioning protocol. The common positioning protocol may simply mean that the same positioning protocol is used regardless of where the location server resides. The location server may determine location information for the target device (block 714).

In one design, the positioning information may comprise measurements for at least one reference source. For example, the location server may obtain measurements for at least one signal from at least one satellite, or at least one base station, or at least one terminal, or the target device, or some other entity, or a combination thereof The location information may comprise a location estimate for the target device, which may be determined by the location server based on the measurements. In another design, the positioning information (i) may be indicative of the location of the target device, e.g., may comprise a coarse or a fine location estimate, or (ii) may comprise measurements of references sources that can be received at the location of the target device. The location information may comprise assistance data determined by the location server based on the positioning information. In yet another design, the location information may comprise assistance data, and the positioning information may comprise measurements made based on the assistance data. In general, the positioning information may comprise measurements, a location estimate, etc. The location information may comprise a location estimate, assistance data, etc. The two steps in FIG. 7 may be performed in the order shown in FIG. 7, or in the opposite order. The location information may be determined based on the positioning information, or vice versa.

In one design, a positioning unit for the target device may determine the positioning information, e.g., make measurements. The positioning unit may reside at one of a second plurality of possible entities, and the target device may be one of these entities. The location server may communicate with the positioning unit via the common positioning protocol. For example, the location server may exchange capabilities, or assistance data, or location information, or a combination thereof with the positioning unit via the common positioning protocol.

FIG. 8 shows a design of a process 800 for supporting positioning by an entity, which may be a target device, or a positioning unit, or some other entity. The entity may send positioning information for a target device to a location server via a common positioning protocol (block 812). The location server may reside at one of a plurality of possible entities and may use the common positioning protocol regardless of where it resides. The target device may be one of the plurality of possible entities. The entity may receive location information for the target device from the location server (block 814).

In one design, the positioning information may comprise measurements for at least one reference source, and the location information may comprise a location estimate for the target device determined by the location server based on the measurements. In another design, the positioning information may comprise measurements of references sources that can be received at the location of the target device, and the location information may comprise assistance data determined by the location server based on the positioning information. In yet another design, the location information may comprise assistance data, and the positioning information may comprise measurements made based on the assistance data. In this design, block 812 may occur after block 814.

In one design, the entity may measure at least one signal from at least one reference source to obtain the measurements. In one design, the at least one reference source may comprise at least one satellite, or at least one base station, or at least one terminal, or a combination thereof. In this design, the measurements may be made at the target device. In another design, the at least one reference source may comprise the target device and possibly other reference sources. In this design, the measurements may be made at a positioning unit that is external to the target device.

Figure 9:
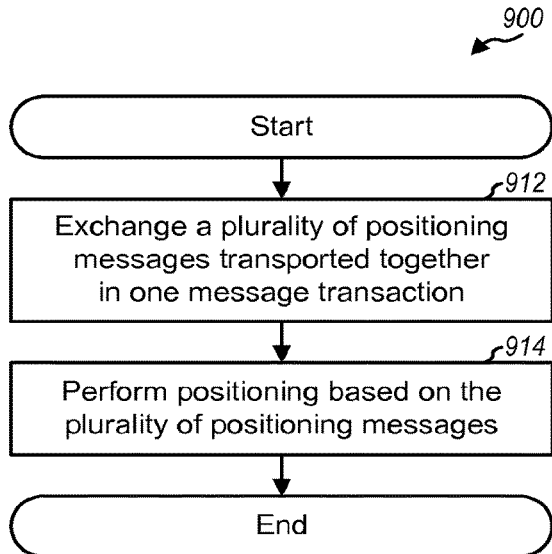

FIG. 9 shows a design of a process 900 for supporting positioning by an entity, which may be a location server, a positioning unit, a target device, or some other entity. The entity may exchange (e.g., send or receive) a plurality of positioning messages transported together in one message transaction (block 912). In one design, the entity may send the plurality of positioning messages as linked messages or in a single container message. In another design, the entity may receive the plurality of positioning messages, which may be sent as linked messages or in a single container message. The entity may perform positioning based on the plurality of positioning messages (block 914).

In one design, the plurality of positioning messages may be sent with an MO-LR message by the target device to initiate positioning. In another design, the plurality of positioning messages may be sent by a location server and may comprise (i) a first positioning message carrying assistance data and (ii) a second positioning message requesting for location information. In yet another design, the plurality of positioning messages may be sent to the location server (e.g., by the positioning unit or the target device) and may comprise (i) a first positioning message requesting for assistance data and (ii) a second positioning message carrying measurements. The plurality of messages may also include some other combination of messages.

In one design, each of the plurality of positioning messages may be of one of a plurality of message types, which may include a request capabilities message type, a provide capabilities message type, a request assistance data message type, a provide assistance data message type, a request location information message type, and a provide location information message type. The plurality of positioning messages may include positioning messages of at least two message types.

Figure 10:
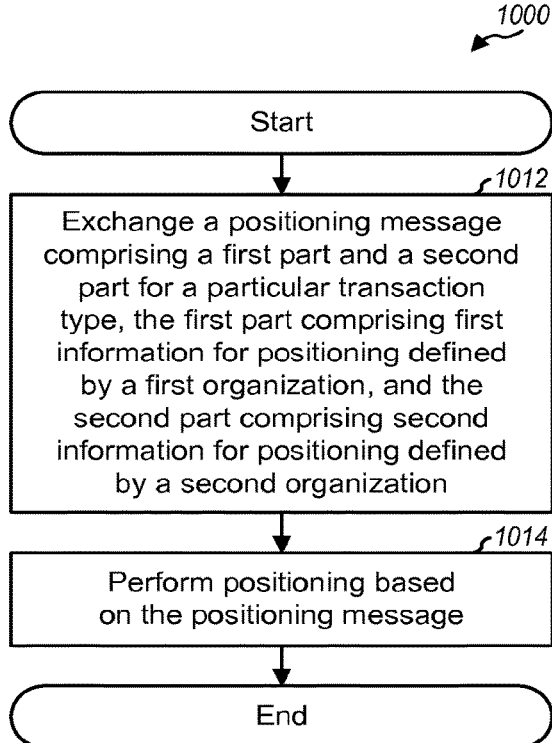

FIG. 10 shows a design of a process 1000 for supporting positioning by an entity, which may be a location server, a positioning unit, a target device, or some other entity. The entity may exchange a positioning message comprising a first part and a second part for a particular transaction type (block 1012). The first part may comprise first information for positioning defined by a first organization, and the second part may comprise second information for positioning defined by a second organization. For example, the first organization may comprise 3GPP or some other organization. The second organization may comprise 3GPP2, OMA, IETF, IEEE, a network operator, an equipment vendor, or some other organization. The entity may perform positioning based on the positioning message (block 1014).

In one design of block 1012, the entity may be a target device sending the positioning message to, or receiving the positioning message from, a location server. In another design, the entity may be a location server sending the positioning message to, or receiving the positioning message from, a target device.

In one design of block 1014, the entity may determine assistance data or a location estimate based on the first information (e.g., measurements) in the first part and the second information (e.g., more measurements, or a coarse location estimate) in the second part. In another design, the entity may make measurements based on the first information (e.g., assistance data for satellites) in the first part and the second information (e.g., assistance data for base stations) in the second part.

Figure 11:
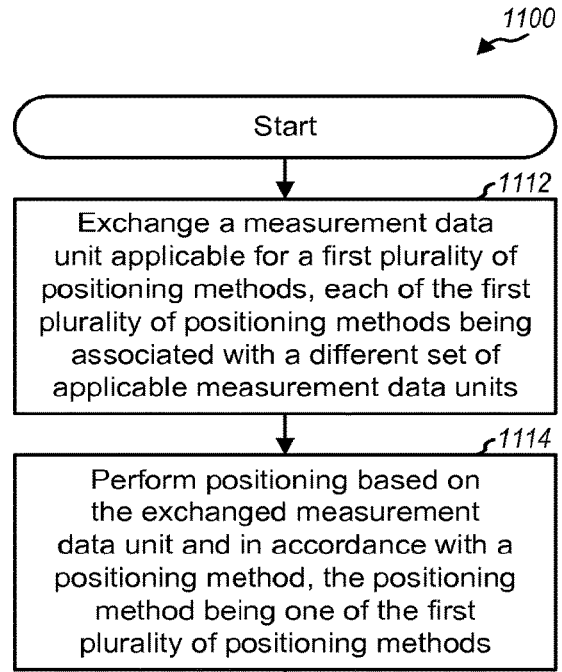
Figure 11:
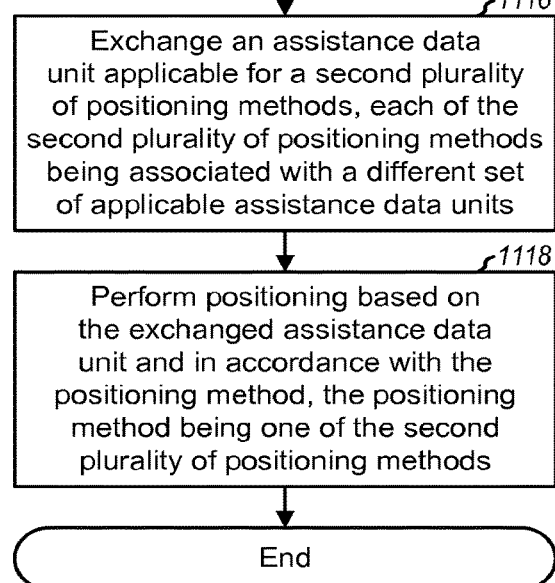

FIG. 11 shows a design of a process 1100 for supporting positioning by an entity, which may be a location server, a positioning unit, a target device, or some other entity. The entity may exchange a measurement data unit applicable for a first plurality of positioning methods, with each of the first plurality of positioning methods being associated with a different set of applicable measurement data units (block 1112). For example, the exchanged measurement data unit may be MDU 2 in FIG. 3, the first plurality of positioning methods may include PMa and PMb, positioning method PMa may be associated with a first set of MDUs 1, 2 and 3, and positioning method PMb may be associated with a second set of MDUs 2 and 3. The entity may perform positioning based on the exchanged measurement data unit and in accordance with a positioning method, which may be one of the first plurality of positioning methods (block 1114).

Alternatively or additionally, the entity may exchange an assistance data unit applicable for a second plurality of positioning methods, with each of the second plurality of positioning methods being associated with a different set of applicable assistance data units (block 1116). The entity may perform positioning based on the exchanged assistance data unit and in accordance with the positioning method, which may be one of the second plurality of positioning methods (block 1118).

In general, only shared measurement data units may be supported, or only shared assistance data units may be supported, or both shared measurement and assistance data units may be supported. If only shared measurement data units are supported, then blocks 1112 and 1114 may be performed, and blocks 1116 and 1118 may be omitted. If only shared assistance data units are supported, then blocks 1116 and 1118 may be performed, and blocks 1112 and 1114 may be omitted. If both shared measurement and assistance data units are supported, the blocks 1112 to 1118 may be performed.

Figure 12:
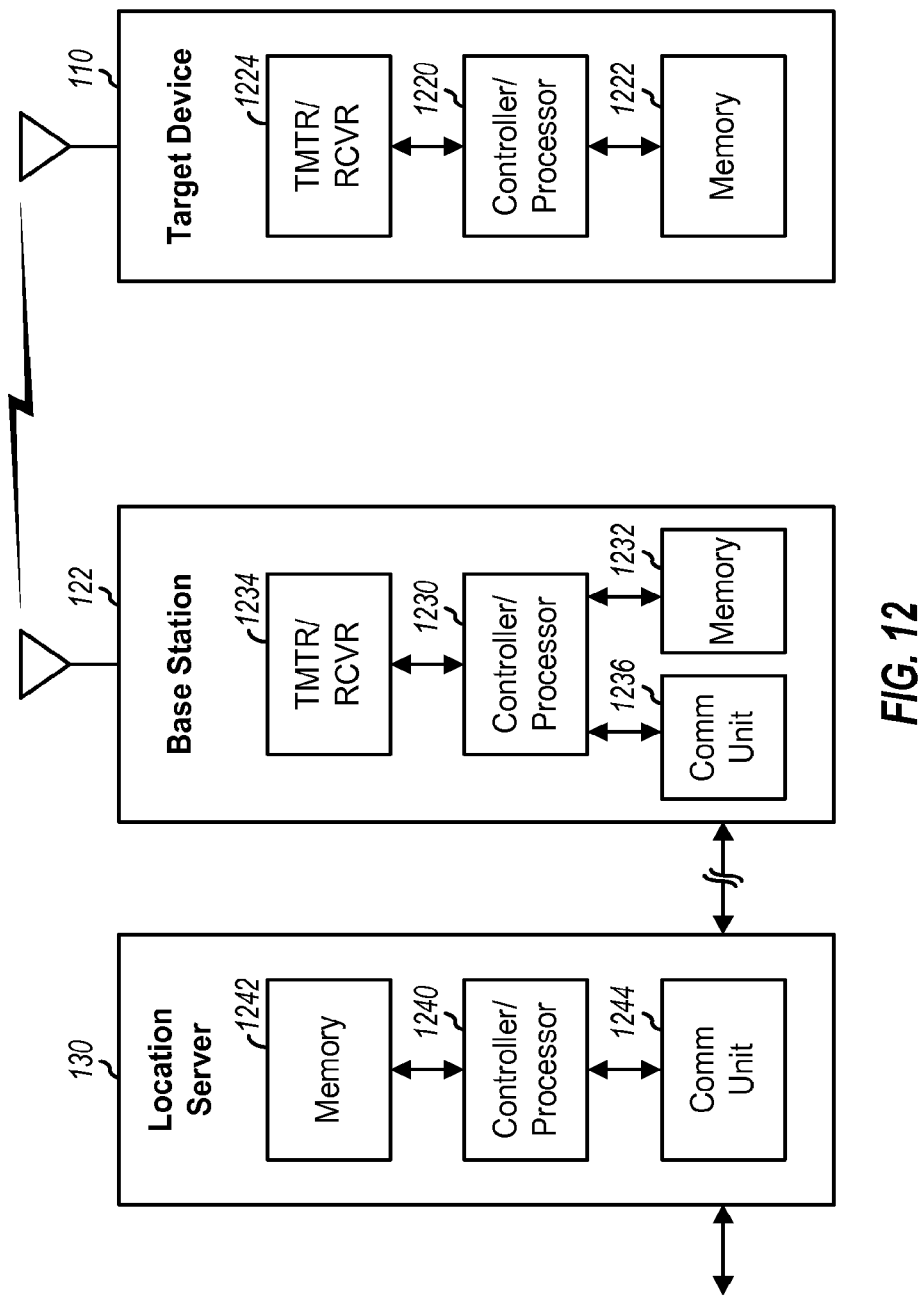
FIG. 12 shows a block diagram of a target device, a base station, and a location server.

FIG. 12 shows a block diagram of a design of target device 110, a base station 122, and location server 130. Target device 110 may be a UE, a SET, etc. Location server 130 may be an SMLC, an E-SMLC, an SLP, etc. Positioning unit 120 may reside in target device 110, base station 122, or some other entity. Reference source 140 may be part of base station 122, or a satellite, or some other entity. For simplicity, FIG. 12 shows only one controller/processor 1220, one memory 1222, and one transmitter/ receiver (TMTR/RCVR) 1224 for target device 110, only one controller/processor 1230, one memory 1232, one transmitter/receiver 1234, and one communication (Comm) unit 1236 for base station 122, and only one controller/processor 1240, one memory 1242, and one communication unit 1244 for location server 130. In general, each entity may include any number of processing units (processors, controllers, etc.), memories, transmitters/receivers, communication units, etc.

On the downlink, base station 122 may transmit data, signaling, and pilot to terminals within its coverage area. These various types of information may be processed by processing unit 1230, conditioned by transmitter 1234, and transmitted on the downlink. At target device 110, downlink signals from base station 122 and other base stations may be received and conditioned by receiver 1224 and further processed by processing unit 1220 to obtain various types of information. Processing unit 1220 may perform process 800 in FIG. 8, process 900 in FIG. 9, process 1000 in FIG. 10, process 1100 in FIG. 11, and/or other processes for the techniques described herein. Memories 1222 and 1232 may store program codes and data for target device 110 and base station 122, respectively. On the uplink, target device 110 may transmit data, signaling, and pilot to base station 122. These various types of information may be processed by processing unit 1220, conditioned by transmitter 1224, and transmitted on the uplink. At base station 122, the uplink signals from target device 110 and other terminals may be received and conditioned by receiver 1234 and further processed by processing unit 1230 to obtain various types of information from the terminals. Base station 122 may directly or indirectly communicate with location server 130 via communication unit 1236.

Within location server 130, processing unit 1240 may perform processing to support location services and positioning for terminals. For example, processing unit 1240 may perform process 700 in FIG. 7, process 800 in FIG. 8, process 900 in FIG. 9, process 1000 in FIG. 10, process 1100 in FIG. 11, and/or other processes for the techniques described herein. Processing unit 1240 may also compute location estimates for target device 110, provide location information, etc. Memory 1242 may store program codes and data for location server 130. Communication unit 1244 may allow location server 130 to communicate with base station 122 and/or other network entities. Location server 130 and target device 110 may exchange positioning messages via base station 122 and other network entities (not shown).

Positioning unit 120 may reside in terminal 110, or base station 122, or location server 130. In this case, the processing by positioning unit 120 may be performed by processing unit 1220, 1230, or 1240, respectively. Positioning unit 120 may also be external to the entities shown in FIG. 12. In this case, positioning unit 120 may include one or more processing units (processors, controllers, etc.), memories, transmitters/receivers, communication units, etc., that can perform the required functions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media can take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for positioning a target device, comprising:
   receiving, from a location server, a Request Location Information message that indicates at least a first positioning method from a plurality of positioning methods, the plurality of positioning methods including the first positioning method and a second positioning method, wherein the Request Location Information message comprises a first field containing information specific to the first positioning method and a second field containing common parameters, wherein the common parameters are applicable to the first positioning method and the second positioning method and also applicable to all positioning methods indicated in the Request Location Information message, and wherein the common parameters comprise a quality-of-service (QoS), an indication of whether periodic location information is requested, an indication of whether triggered location information is requested, or any combination thereof, and wherein the plurality of positioning methods comprises: an uplink time difference based positioning method, a downlink time difference based positioning method, a propagation time based positioning method, a signal direction based positioning method, a path loss based positioning method, a radio frequency pattern matching positioning method, assisted Global Navigation Satellite System positioning method, enhanced cell identity positioning method or any combination thereof; and
   performing positioning in response to the Request Location Information message.

2. The method of claim 1, wherein performing positioning in response to the Request Location Information message comprises determining a location estimate for a location of the target device.

3. The method of claim 2, further comprising:
   sending the location estimate to the location server, wherein the location estimate is a coarse estimate, and wherein the location server determines a fine location estimate based on the coarse estimate.

4. The method of claim 1, further comprising:
   periodically sending updated location information to the location server based on determining that the common parameters comprise the indication that periodic location information is requested.

5. The method of claim 1, wherein the common parameters included in the Request Location Information message further comprise a location type for a terminal-assisted positioning method, a location type for a terminal-based positioning method, or both.

6. The method of claim 5, wherein the common parameters included in the Request Location Information message further comprise a location type for at least one of the following positioning methods: assisted Global Navigation Satellite System, observed time difference, enhanced observed time difference, observed time difference of arrival, and advanced forward link trilateration.

7. The method of claim 1, wherein the Request Location Information message is one of a plurality of positioning messages exchanged between the location server and a recipient of the Request Location Information message, and wherein the plurality of positioning messages comprises one or more of:
   a Request Capabilities message to request capabilities of a receiving entity for a positioning protocol and positioning methods,
   a Provide Capabilities message to provide capabilities of a sending entity for a positioning protocol and positioning methods, and
   a Provide Location Information message to provide location information.

8. The method of claim 7, further comprising:
   receiving a Request Capabilities message from the location server; and transmitting, in response to the Request Capabilities positioning message, capabilities of the target device to the location server in a Provide Capabilities message.

9. The method of claim 8, wherein the capabilities include an indication of one or more positioning methods supported by the target device and the capabilities of the target device for each positioning method supported by the target device.

10. An apparatus for positioning a target device, comprising:
at least one processing unit; and
a memory coupled to the at least one processing unit, the memory storing instructions that when executed by the at least one processing unit cause the at least one processing unit to:
receive, from a location server, a Request Location Information message that indicates at least a first positioning method from a plurality of positioning methods, the plurality of positioning methods including the first positioning method and a second positioning method, wherein the Request Location Information message comprises a first field containing information specific to the first positioning method and a second field containing common parameters, wherein the common parameters are applicable to the first positioning method and the second positioning method and also applicable to all positioning methods indicated in the Request Location Information message, and wherein the common parameters comprise a quality-of-service (QoS), an indication of whether periodic location information is requested, an indication of whether triggered location information is requested, or any combination thereof, and wherein the plurality of positioning methods comprises: an uplink time difference based positioning method, a downlink time difference based positioning method, a propagation time based positioning method, a signal direction based positioning method, a path loss based positioning method, a radio frequency pattern matching positioning method, assisted Global Navigation Satellite System positioning method, enhanced cell identity positioning method or any combination thereof; and
perform positioning in response to the Request Location Information message.

11. The apparatus of claim 10, wherein performing positioning in response to the Request Location Information message comprises determining a location estimate for a location of the target device.

12. The apparatus of claim 11, wherein the instructions further cause the at least one processing unit to:
send the location estimate to the location server, wherein the location estimate is a coarse estimate, and wherein the location server determines a fine location estimate based on the coarse estimate.

13. The apparatus of claim 10, wherein the instructions further cause the at least one processing unit to:
periodically send updated location information to the location server based on determining that the common parameters comprise the indication that periodic location information is requested.

14. The apparatus of claim 10, wherein the common parameters included in the Request Location Information message further comprise a location type for a terminal-assisted positioning method, a location type for a terminal-based positioning method, or both.

15. A non-transitory computer-readable medium storing instructions for positioning a target device, wherein the instructions when executed by the one or more processors cause the one or more processors to:
receive, from a location server, a Request Location Information message that indicates at least a first positioning method from a plurality of positioning methods, the plurality of positioning methods including the first positioning method and a second positioning method, wherein the Request Location Information message comprises a first field containing information specific to the first positioning method and a second field containing common parameters, wherein the common parameters are applicable to the first positioning method and the second positioning method and also applicable to all positioning methods indicated in the Request Location Information message, and wherein the common parameters comprise a quality-of-service (QoS), an indication of whether periodic location information is requested, an indication of whether triggered location information is requested, or any combination thereof, and wherein the plurality of positioning methods comprises: an uplink time difference based positioning method, a downlink time difference based positioning method, a propagation time based positioning method, a signal direction based positioning method, a path loss based positioning method, a radio frequency pattern matching positioning method, assisted Global Navigation Satellite System positioning method, enhanced cell identity positioning method or any combination thereof; and
perform positioning in response to the Request Location Information message.

16. The non-transitory computer-readable medium of claim 15, performing positioning in response to the Request Location Information message comprises determining a location estimate for a location of the target device.

17. The non-transitory computer-readable medium of claim 16, wherein the instructions further cause the one or more processors to:
send the location estimate to the location server, wherein the location estimate is a coarse estimate, and wherein the location server determines a fine location estimate based on the coarse estimate.

18. The non-transitory computer-readable medium of claim 15, wherein the instructions further cause the one or more processors to:
periodically send updated location information to the location server based on determining that the common parameters comprise the indication that periodic location information is requested.

19. The non-transitory computer-readable medium of claim 15, wherein the common parameters included in the Request Location Information message further comprise a location type for a terminal-assisted positioning method, a location type for a terminal-based positioning method, or both.

* * * * *